United States Patent [19]

Blayne et al.

[11] Patent Number: 4,595,553
[45] Date of Patent: Jun. 17, 1986

[54] METHOD FOR VENTLESS TIRE MOLDING

[75] Inventors: Jerome J. Blayne, Brecksville; James Sidles, Richfield; Donald R. Bartley, Cuyahoga Falls, all of Ohio

[73] Assignee: The B. F. Goodrich Company, New York, N.Y.

[21] Appl. No.: 781,578

[22] Filed: Sep. 30, 1985

Related U.S. Application Data

[62] Division of Ser. No. 674,397, Nov. 23, 1984.

[51] Int. Cl.[4] .............................................. B29H 5/02
[52] U.S. Cl. ................................ 264/501; 425/405 R; 425/DIG. 60; 425/28 R
[58] Field of Search ............. 264/501, 102; 425/28 R, 425/35, 405 R

[56] References Cited

U.S. PATENT DOCUMENTS

| | | | |
|---|---|---|---|
| 1,276,411 | 8/1918 | Price | 264/102 |
| 2,772,012 | 11/1956 | Crabtree | 215/40 |
| 2,779,386 | 1/1957 | Waters | 264/102 |
| 2,841,823 | 7/1958 | Hartesveldt | . |
| 2,876,492 | 3/1959 | Frieder et al. | . |
| 3,520,024 | 7/1970 | Caretta et al. | 18/17 |
| 3,842,150 | 1/1973 | Carter | 264/102 |
| 3,854,852 | 12/1974 | Carter | 425/40 |
| 3,983,193 | 9/1976 | Wulker et al. | 264/36 |
| 4,185,065 | 1/1980 | Knipp et al. | 264/254 |
| 4,224,276 | 9/1980 | Gallizia | 264/571 |
| 4,347,212 | 8/1982 | Carter | 264/315 |

Primary Examiner—J. Howard Flint, Jr.
Attorney, Agent, or Firm—Woodrow W. Ban

[57] ABSTRACT

A method and apparatus whereby tire mold is closed to within approximately one inch of full closure with a green tire in place therein for molding, and the mold is then evacuated employing a vacuum conduit prior to full mold closure whereby air within the mold cavity is evacuated and the necessity for vent holes in the mold is eliminated. A mold for practice in the invention is free of vent holes in the thread, sidewall, and bead portions of the mold and includes, along the parting line, at least one vacuum conduit whereby the mold cavity may be evacuated to not more than 16932 Pa within not more than about 60 seconds employing a source of vacuum. Seals are provided radially outward of the vacuum conduit along the parting line, and, where necessary, adjacent any moveable bead ring associated with the tire mold. Seals are preferably of a type wherein a differential between pressures experienced by one seal surface and obverse seal surface cause a more effective sealing arrangement. Tires emerging from the mold in accordance with the processes of this invention are free of rubber projections associated with cured rubber entering into vent holes associated with ordinary tire molds.

7 Claims, 7 Drawing Figures

METHOD FOR VENTLESS TIRE MOLDING

CONTINUATION APPLICATION DATA

This application is a division of U.S. Ser. No. 06/674,397, filed Nov. 23, 1984.

FIELD OF THE INVENTION

This invention relates to methods for molding tires and more particularly to methods for the prevention of air entrapment within a mold during time molding. More specifically, this invention relates to a method for the molding of tires without the necessity for employing mold vents.

BACKGROUND OF THE INVENTION

Tires, conventionally, are produced by forming or "laying up" of uncured or so-called green tire components on a tire building machine. The resulting green tire is then removed from the tire building machine and placed into a tire mold. The tire mold generally is configured to apply heat and pressure to the green tire forcing the green tire to conform to the configuration of a cavity within the tire mold, and through curing, retain that desired configuration. It is desirable that the cured tire conform quite closely to the configuration established by the tire mold, and such conformance is in significant measure dependent upon avoiding air entrapment between the green tire and molding surfaces of the mold.

Conventionally, the presence of air between the green tire and molding surfaces of the mold during molding operations is substantially precluded by the provision of a substantial plurality of small-bore passages or apertures extending from molding surfaces of the mold through the structure of the mold to points external to the mold. Thus, as the green tire is moldingly forced into close conformance with molding surfaces of the mold, air entrapped between the green tire and molding surfaces of the mold tends to be forced from the mold cavity via the apertures or passages. These apertures or passages conventionally are termed "vents".

While such vents typically provide for an acceptable evacuation of air from the mold, green or uncured rubber forming a portion of the green tire being molded enters these vents subsequent to entrapped air having been forced from the mold. This green rubber cures within the vents, remaining attached to the tire being molded after curing so that when the mold is opened, and the cured tire is removed, these vents provide a plethora of needle like projections protruding generally perpendicularly from the surface of the cured tire. These projections are also termed "vents" conventionally and provide the tire with an external appearance generally regarded as objectionable.

Such protrusions or projections protruding from the cured tire generally are removed by placing the tire on a machine whereby the finished, cured tire can be spun, and cutting, either automatically or by hand labor, these projections from the tire. Termed "vent trimming", this projection cutting procedure typically adds to the manufacturing cost of the finished cured tire and results often in the generation of a significant quantity of waste or blemished tires where the trimming operation goes awry, producing a cut or surface blemished tire. In addition, after vent trimming, the tire surface remaining often is considered to be possessed of a general, overall unattractive appearance.

It has been suggested that were air to be removed from the mold cavity employing a vacuum during the molding process, the necessity for at least some mold vents may be obviated. Accordingly, in one proposal exemplified by U.S. Pat. No. 1,276,411, a plurality of tire molds were placed within a large press cavity, and the press cavity was evacuated thereby evacuating the plurality of molds. The press was then actuated to compress the molds within the cavity in order to form finished tires.

In another proposal exemplified by U.S. Pat. No. 2,779,386, vacuum was introduced to the mold along a mold parting line and the tread portions and ply portions of the green tire were punctured so as to create air pathways from a zone adjacent an interface between the tire interlayer and the carcass of the tire to remove any entrapped air from this zone.

In still another proposal exemplified by U.S. Pat. Nos. 4,347,212; 3,842,150; and 3,854,852, a plurality of valves were positioned embeddedly within the mold along, particularly, sidewall portions of the mold. The valves in this proposal were configured to open as the mold closed, and to evacuate air from within the mold as the green tire was pressed against the molding surfaces of the mold. The valves were configured, hopefully, to close before being contaminated with rubber forced into the valves during the molding process. Each valve was connected to a source of vacuum so as to provide for evacuation of the mold. Others have employed poppet valves in tread but not sidewall portions of the mold.

In yet another proposal exemplified by U.S. Pat. No. 3,983,193, green tire portions being applied in a retreating operation have been surrounded with an elastomeric bag having a vacuum suction port whereby a vacuum cavity may be created surrounding the tire being retreaded.

The foregoing proposals have generally failed to meet with commercial success for a variety of reasons. Where a plurality of molds are contained within an evacuated press for molding, time constraints associated with assembling and disassembling molds containing green tires for introduction into a hydraulic press has generally proven excessively costly. For processes wherein vacuum is drawn along a parting line to evacuate, particularly interior interfaces of portions of the green tire carcass, a failure to achieve a significant, reliably effective vacuum has contributed to commercial disinterest in such processes. Where a plurality of poppet type valves are employed positioned for example along a sidewall portion of a tire mold, difficulties in evacuating tread portions of the mold frequently have resulted in the production of an unacceptably elevated number of less than acceptable quality tires. In processes wherein a polymeric bag surrounds a green tire portion being applied as a retread, difficulties in assembling and disassembling such a bagged green tire has contributed substantially to commercial disinterest.

A process wherein a quality tire is produced without the necessity for providing vent holes or so-called vents in a tire mold reliably and without significant extension to the processing cycles of existing tire mold presses could find substantial utility in the commercial manufacture of tires by elimination of costly tire vent trimming and by savings of rubber otherwise lost in the vent trimming operations.

DISCLOSURE OF THE INVENTION

The present invention provides a method for substantially evacuating a tire mold containing a green tire to be cured and molded immediately prior to the onset of the molding and curing operation. Particularly, in those processes wherein a green tire that includes tread, sidewall and bead portions is formed and then molded within a tire mold having tread, sidewall, and bead components, at least some components separated by a parting line, the present invention provides for evacuation of the mold prior to the curing and molding of a green tire so that no vent holes or apertures are necessary between molding surfaces of the tire mold and points external to the tire mold.

In such a process, a conduit means is provided along the parting lines interruptedly joined to a source of vacuum. The green tire is placed within the mold, and the mold is partially closed so as to be open along the parting line not more than about 5.08 and not less than about 0.10 centimeters. The parting line is circumferentially sealed radially outwardly of the conduit means so that movement of air into the mold along the parting line is substantially precluded. Any other pathways by which air may enter the mold are similarly sealed to substantially preclude the movement of air into the mold.

The source of vacuum is then applied to the conduit means whereby the mold is evacuated to an absolute pressure not exceeding about 16932 Pa in a time period of not more than about 60 seconds. The mold is then fully closed and the tire is cured in accordance with usual and customary procedures.

Typically the tire mold for practicing the process of the instant invention includes at least one bead component moveable with respect to an adjacent sidewall component and the process therefore includes a step of sealing between the moveable bead component and the adjacent sidewall component so as to preclude substantially the movement of air between the components into the mold. Preferably the mold is evacuated to not more than about 8466 Pa in a time period not exceeding approximately 45 seconds. Most preferably, the evacuation pressure does not exceed 2000 Pa. It is much preferred that the mold be open between about 1.27 and 3.81 centimeters during vacuum evacuation. Additionally, it is preferable that the mold remain sealed against movements of air from points external to the mold into the mold once fully closed for tire curing.

The seals employed in practicing the process of the instant invention are preferably those having one surface exposed to pressure within the mold and an obverse surface exposed to pressure sourced outside the mold, typically ambient pressure, so that evacuation of the mold, by inherent seal configuration, urges the seal into a tighter sealing relationship.

The process of the instant invention can be practiced in an improved tire mold having tread, sidewall, and bead components typically radially divided by a circumferential parting line with some of the mold components being moveable to open and close the mold along the parting line. The bead, tread and sidewall components provide an inner mold surface free of venting outlets by which a fluid may pass from within the mold to without and visa versa. At least one conduit means is positioned along the parting line radially outwardly of the mold tread component and radially inwardly of a parting line seal with the conduit means being configured for interruptable inconnection with the source of vacuum. The conduit means and vacuum source are configured whereby the mold, upon being sealed, may be evacuated to not more than about 16932 Pa within a time period of not more than about 60 seconds.

A parting line self actuating or inflatable-tube seal is circumferentially arranged radially outwardly of the conduit means and configured to sealingly engage at at least one point in a range of parting lines openings of between 0.10 and not more than 5.08 centimeters to substantially preclude the movement of air into the mold. The seal is configured to be capable of continuing to preclude such air movement during and even after mold closure. Such seals are comprised of a surface exposed to pressure within the mold and an obverse surface exposed to a pressure sourced outside the mold, typically ambient pressure.

In preferred embodiments of a mold useful in the practice of the process of the instant invention, at least one of the bead components is moveable relative to an adjacent sidewall component. The mold includes a bead seal circumferentially sealing between the moveable bead component and the adjacent sidewall component, while the circumferential parting line seal is sealingly engaged. The bead seal is affixed to one of the components and is of a nature wherein one seal surface is exposed to a pressure within the mold and an obverse surface is exposed to a pressure sourced outside the mold so that mere evacuation of the mold, by inherent seal configuration, urges the seal into a tighter sealing relationship. The seal is configured to continue to exclude movement of air into the mold after mold closure. The parting line circumferential seal and the bead seal are either so-called self actuating seals or inflatable-tube type configurations.

Preferably the vacuum source includes a plurality of stages configured for being consecutively interconnected with the conduit means whereby the mold cavity may be evacuated in a staged manner from an initial, modest vacuum to a desired final vacuum.

The seals, as set forth, provide a means for sealing a tire mold along the parting line and along any bead-sidewall component interface in a manner sufficient to support evacuation of the mold to at least 16932 Pa, preferably to at least 8466 Pa, more preferably to not more than 6600 Pa, and most preferably to at least 2000 Pa.

Employing the process of the instant invention, a tire is produced, which, when removed from the mold, is characterized by having no sidewall, bead, or tread vents protruding beyond the periphery of the tire as established by the outermost surface of the bead, sidewall, and tread portions of the tire.

The above and other features and advantages of the instant invention will become more apparent when considered in light of a detailed description of the invention and drawings, together forming a part of the specification.

BEST EMBODIMENTS OF THE INVENTION

Figure 1:
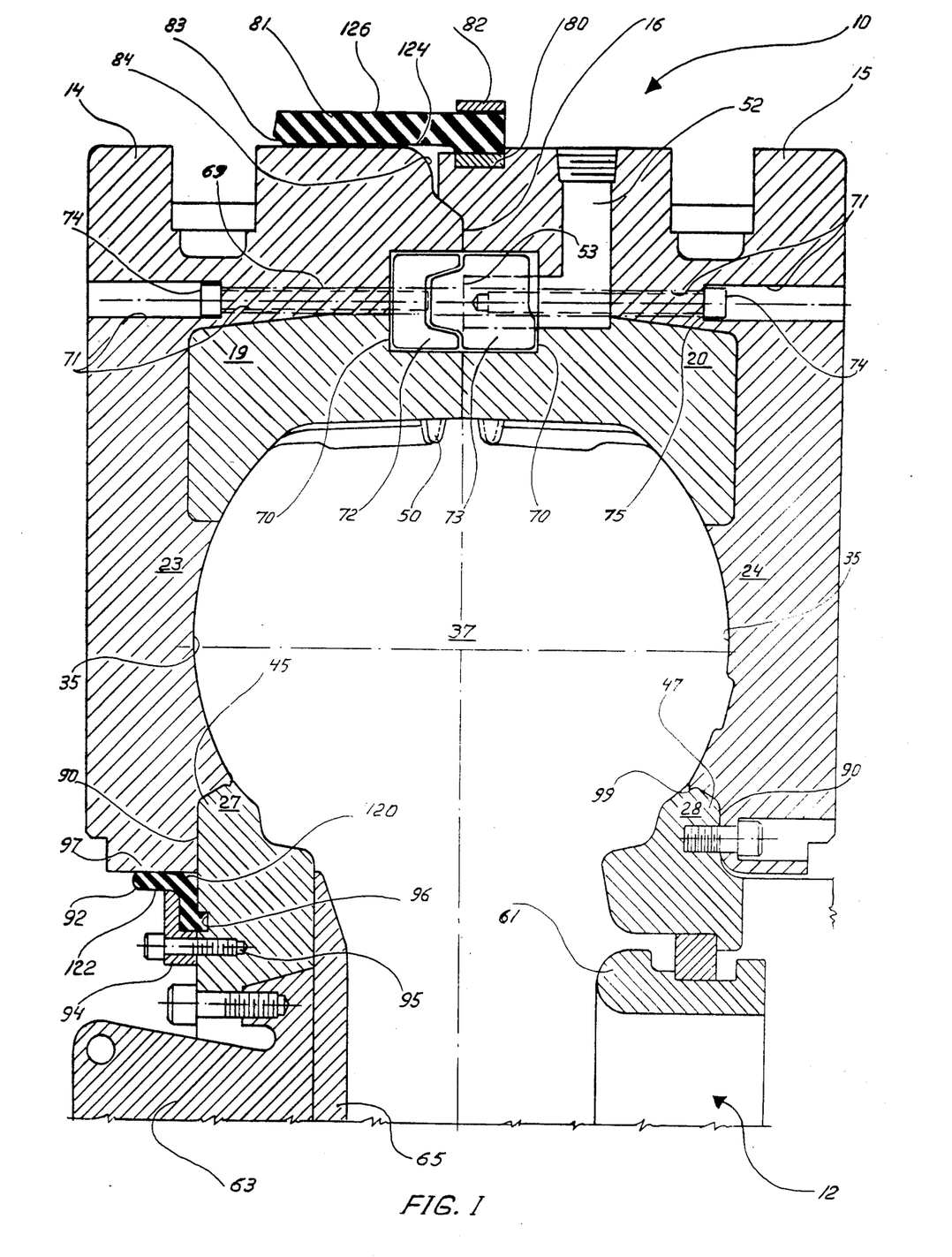
FIG. 1 is a partial side elevational view of a tire mold and tire molding press for practicing the method of the instant invention.

The present invention provides a method and apparatus for moldingly making a tire, the finished tire emerging from the mold without the customary plurality of projections from the outer surface of the tire formed by the curing of tire rubber compound in vent holes provided in a conventional tire mold. Referring to the drawings, a mold 10 suitable for use in the practice of the instant invention is depicted in FIGS. 1–2.

Figure 2:
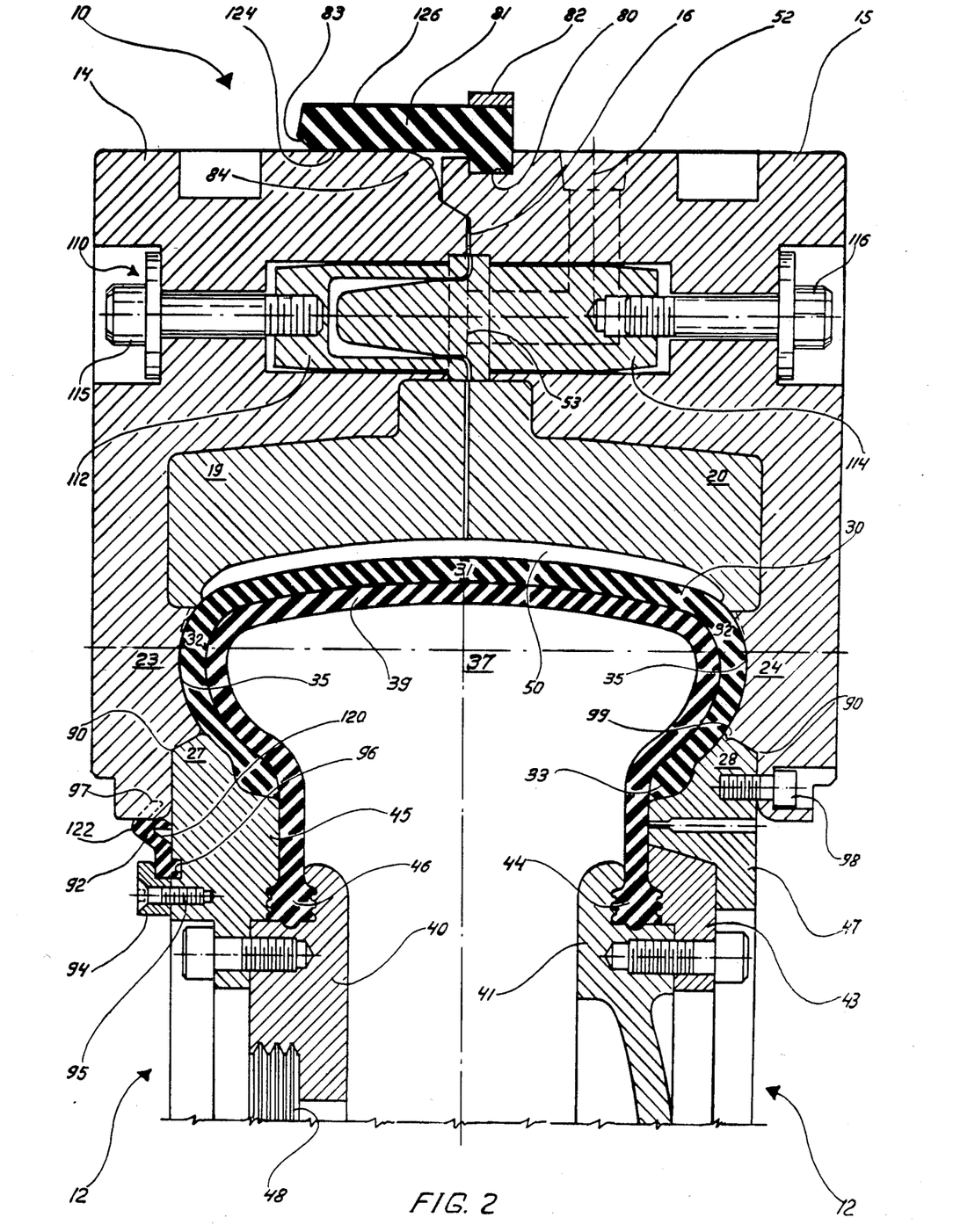
FIG. 2 is a partial side elevational view of a tire mold and tire molding press for practicing the method of the instant invention.

Referring to FIG. 2, the mold 10 is employed in a tire press 12 which is shown only partially in FIG. 2. The mold 10 includes a lower or male section 14, and an upper or female section 15. A parting line 16 separates the male and female sections 14, 15, with at least one of the sections 14, 15, being moveable in a direction perpendicular to the parting line away from the remaining section. By separating the sections 14, 15, the mold is opened for introducing a green tire to be molded.

Each mold section 14, 15, includes tread ring components 19, 20; sidewall components 23, 24; and bead ring components 27, 28. The bead components 27, 28 in some press-mold configurations may be more properly associated with the press 12, but for purposes of simplicity in describing the instant invention are considered together with the tread 19, 20 and sidewall components 23, 24 of the mold 10.

A green tire 30 is received in the mold; the green tire is possessed of tread 31, sidewall 32, and bead 33 portions. When the mold 10 is closed along the parting line 16, a molding surface 35 is defined by the tread 19, 20, sidewall 23, 24, and bead 27, 28 components of the mold. The molding surface 35 may be textured in known manner to facilitate air movement during mold evacuation. A mold cavity, indicated generally at reference numeral 37 is thereby defined within the mold.

A bladder 39 is provided within the mold cavity 37. A lower clamp ring 40 and an upper clamp ring 41 function to retain the bladder within the mold cavity. The upper clamp ring 41 cooperates with an upper mold ring 43 to retain an upper ring 44 of the bladder while the lower clamp ring 40 cooperates with a lower bead ring 45 to retain a lower bladder ring 46. An upper bead ring 47 is retained in the mold 10. The lower clamp ring 40 is retained to the press 12 employing a threaded ring 48.

In use, a pressurized fluid is introduced into the bladder 39 which causes the bladder 39 to expand against the green tire 30. The green tire is thereby pressed against the forming or tire molding surface 35 of the mold cavity; the tire molding surface 35 or forming surface may include protrusions 50 which can assist in forming desired shapes in a final cured tire. While the mold 10 is being heated, the green tire 30 is pressed against the molding surface 35 and curingly conforms to the configuration of the molding surface 35 and protrusions 50 to produce a final tire having rubber components thereof cured or vulcanized.

The mold 10 as described herein is typical of many tire molds used in the forming of, particularly, tubeless tires in industry. One noticeable difference between the mold 10 of FIG. 2 and conventionally employed molds is a complete absence of a plurality of small bore passageways or apertures extending from the molding surface 35 through the mold to points external to the mold and press. Such small bore passageways, commonly known as vents, provide for releasing air that would otherwise become trapped between the molding surface 35 and the green tire 30 during the tire molding operations. Where not properly eliminated by venting, such entrapped air can prevent the green tire 30 from conforming fully to the contours of the molding surface 35 and thereby introduce deformities in the resulting final, cured, tire particularly in the cured rubber outer surface of the cured tire. Entrapped air may also function as an insulator, slowing the curing process and contributing to an incompletely cured final tire.

In the instant invention the mold is modified to include a conduit means 52 interruptedly connectable to a source of vacuum (not shown in FIG. 2). The conduit means 52 or vacuum conduit means communicates between a point 53 on the parting line 16 and the vacuum source. The point 53 is positioned radially outwardly of the tread portions 19, 20. Typically such a conduit means 52 can be formed by cross boring the mold 10; the cross bores may range in size from about 0.635 centimeters to about 5.08 centimeters in diameter. At least one conduit means 52 is provided along the parting line, but depending upon the diameter of the tire mold 10, the volume of the mold cavity 37, and the size of the conduit means 52, a plurality of conduits 52 may be desirable at annularly spaced intervals around the tire mold 10 along the parting line 16.

An interface 90 exists between the upper bead ring 47 and the mold section 15 and between the lower bead ring 45 and the mold section 14. The upper bead ring 47 is retained to the mold section 15 employing fasteners 98. The interface 90 between the mold section 15 and the upper bead ring 47 typically fills with rubber during a first tire cure cycle; the rubber thus filling the interface 90, once cured effectively seals the interface 90 to movement of air from a point external to the mold 10 into the mold cavity 37. A small wedge 99 formed in either the section 15 or the bead ring 47 along the interface 90 can substantially assist in sealing this interface 90.

The embodiment of FIG. 2 is a representation of a mold 10 and portions of a press 12 known as a McNeil B.O.M. press, commercially available. The mold 10 of FIG. 2 includes a recess notch 80 for receiving a shroud seal 81 having a bevel 83, the shroud seal being retained within the notch 80 employing a clamp ring 82 tightened to retain the seal 81. A chamber or radius 84 assists sliding motion of the seal 81. A bead seal 92 is provided retained in a recess or notch 96 provided in a lower bead ring 45. A bead seal retainer 94, retained by fasteners 95, functions to retain the bead seal 92 within the notch 96. The bead seal 92 is resiliently deformable from a resting position shown in phantom at 97 to an actuated position achieved as the bead ring 45 is seated compressing the seal 92 against the mold section 14.

A dowel pin assembly 110 is provided having a dowel bushing 112 and a dowel pin 114. Fasteners 115, 116 function to retain the dowel pin and dowel bushing 112 in the assembly. The dowel pin assemblies 110, a plurality of which are spaced along the parting line 16 radially outwardly of the tread sections 19, 20, function to align the mold during closure to assure a uniform tire formation.

A vacuum conduit means 52 is provided positioned radially inwardly of the shroud seal 81 and the shroud seal 81 and bead seal 92 are configured to engage sealingly at one or more points while the mold remains partially open at a point at least between about 0.10 and 5.08 centimeters and to remain in sealing engagement during subsequent full closure of the mold. Typically the bead ring 45 is seated and the seal 92 engaged before mold 10 closure.

Preferably, the seals 81, 92 are highly deformable and the seal 81 is configured whereby a sealing relationship between the mold sections 14, 15 can be established at one or more points while the mold sections 14, 15 remain separated along the parting line by between 0.10 centimeters and about 5.08 centimeters. The seals 81, 92 must provide continuous sealing from point of initial seal 81 engagement in a range of 0.10 to 5.08 centimeters until the mold has fully closed for curing the tire. The seals 81, 92 should seal in such a way that movement of air along the parting line 16 and interface 90 from points exterior to the mold into the internal mold cavity 38 is essentially precluded.

It is important in selecting the seals 81, 92 that the seals 81, 92 be configured to be substantially resilient. Where the seals deform or otherwise become insufficiently resilient to reliably seal between the sections 14, 15 of the mold 10 and between the sections 14, 15 of the mold 10 and the bead ring, then air will tend to move both along the parting line 16 and between the mold sections 14, 15 and the bead rings from points exterior to the mold 10 into the mold cavity 37. Inadequate evacuation of air from the mold cavity 37 can result, substantially increasing the likelihood for improper formation of the green tire 30 to produce a final tire having a properly shaped and cured particularly outer surface, free of lightness.

Referring to the drawings, FIG. 1 is a representation of an alternate mold 10 and press 12 embodiment suitable for the practice of the method of the instant invention. In FIG. 1, items functionally or structurally similar to items in FIG. 2 have been assigned identical reference numerals. The mold 10 and press 12 of FIG. 1 is typical of mold 10 and press 12 arrangements found on so-called Auto-Form Bagwell presses available from NRM Manufacturing Company. Such presses and general mold configurations are widely employed in the tire industry.

In FIG. 1, the mold 10 includes a male section 14 and a female section 15 separated by a parting line 16. The sections 14, 15 are moveable away one from the other in a direction perpendicular to the parting line 16. The mold 10 includes tread components 19, 20, sidewall components 23, 24, and bead components 27, 28. As in FIG. 2, the bead components 27, 28 are defined by bead rings 45, 47.

In FIG. 1, a tire has been omitted for clarity in showing the mold. Likewise, a bladder has been omitted for depiction clarity. In the mold embodiment of FIG. 1, any bladder is retained within the press employing a bladder well 61. A spider 63 and a plurality of sector plates 65 cooperating to retain the bead ring 45.

The tread components 19, 20, sidewall components 23, 24, and bead components 27, 28 cooperate to define a molding surface 35, optionally textured in well known manner, surrounding a mold cavity 37. As in FIG. 2, expansion of a bladder against an inner surface of a tire contained within the mold 10 when closed, functions to force the tire against the mold for shaping while heat supplied to the bladder and typically to the tire mold 10 functions to cure the tire.

Alignment of the mold 10 sections 14, 15 for closure along the parting line desirably is facilitated by the provision of a plurality of dowel pin assemblies 69 positioned circumferentially surrounding the mold cavity 37 along the parting line 16. Each mold section 14, 15, includes a shoulder 70 formed in conjunction with a bore 71. A dowel bushing 72 and a dowel pin 73 are received within the bores 71 and are retained against the shoulders 70 by through fasteners 74. The fasteners 74 can be of any suitable or conventional nature such as machine screws abutting a shoulder 75.

At least one vacuum conduit means 52 is provided within the sector 15 communicating between the parting line and a point exterior to the mold for the transmission of air therebetween. A vacuum system (not shown in FIG. 1) is interconnectably configured for drawing a vacuum through the vacuum conduit means 52. Interconnection between the vacuum conduit means 52 and the vacuum means can be of any suitable or conventional form such as manual or solenoid operated valving.

A parting line keyway 80 is provided in one of the sections 14,15. A shroud seal 81 is provided configuration for being retainably received within the keyway 80. A ring clamp 82 is provided which, upon tightening, is configured to compress the shroud seal 81 retainably into the keyway. Desirably, the shroud seal includes a beveled portion 83 which facilitates movement of the shroud seal over a chamfer or radius 84 provided adjacent the outer edge of the parting line 16 on the mold section 14.

The shroud seal 81 can be made from any suitable or conventional elastomeric material but should be shaped to be capable of forming a seal between the sectors 15, 14 along the parting line 16 while the mold 10 is partially open along the parting line 16 and also when the mold 10 is fully closed along the parting line 16. It is desirable that the seal 81 function to substantially preclude the passage of air along the parting line 16 into the mold cavity 37 beginning at a point where the mold 10 is open in a range of between about 0.10 and 5.08 centimeters as measured perpendicularly between the mold sections 14, 15 along the parting line 16. The shroud seal 81 is positioned radially outwardly of the vacuum conduit means 52 so that when a vacuum is applied to the vacuum conduit means 52, the mold cavity 37 can be evacuated while air external to the mold is substantially precluded from entering the mold cavity 37 along the parting line 16.

Suitable or conventional materials finding acceptance in the manufacture of shroud seals 81 in both FIGS. 1 and 2 include resin cured butyl rubbers, silicone rubbers, phenolic cured butyl rubbers, and fluorocarbon rubbers such as Viton rubber and Kel F rubber, all readily commercially available. Inclusion of lubricants such as oils and/or graphite may prolong seal life.

An opportunity for air to move from points external to the mold cavity 13 into the mold cavity 37 also exists along interface lines 90 between the bead ring 45 and the mold section 14, and between the bead ring 47 and the mold section 15. The bead ring 45 in the embodiment of FIG. 1 is moveable away from the mold section 14 whereas the bead ring 47 is stationary relative to the mold section 15. The interface 90 between the mold section 15 and the bead ring 47 may be sealed by rubber entering along the interface line 90, filling a notch 99 and curing therein during a first tire cure. The cured rubber remains within the notch 99 throughout subsequent cures performed within the mold 10.

The interface line between the mold section 14 and the bead ring 45 can be sealed employing a flexible bead seal 92 circumferentially surrounding the bead ring 45 mold and retained to the bead ring 45 employing a bead ring seal clamp 94. The bead ring seal clamp 94 can be retained to the bead ring in any suitable or conventional manner such as employing fasteners 95. The bead ring seal 92 is resiliently biased, joining a keyway 96 formed in the bead ring 45 and assuming a position 97 shown in phantom when the bead ring 45 is out of contact with the mold section 14.

Upon seating of the bead ring, the bead ring seal 92 is resiliently biased away from the phantom position 97 to effect sealing. The bead ring seal 92 can be made from the same materials as are used in forming the shroud seal 81. The bead ring seal 92 should function to preclude essentially all movement of air from points exterior to the mold 10 into the mold cavity 37 during the drawing of vacuum and the molding of a tire. Where the bead ring 45 is not seated prior to mold closure, the range of mold openings at which the bead ring seal 92 should preclude the movement of air into the mold desirably should be co-extensive generally with the range of partial mold openings for which the shroud seal 81 substantially precludes the movement of air along the parting line 16 into the mold cavity 37. Preferably this range is 0.10 to 5.08 centimeters along the parting line and most preferably between about 1.27 and 3.81 centimeters. Regardless of when seated, the bead ring seal 92 should function when the mold is completely closed to substantially preclude the movement of air into the mold cavity 37.

Figure 4:
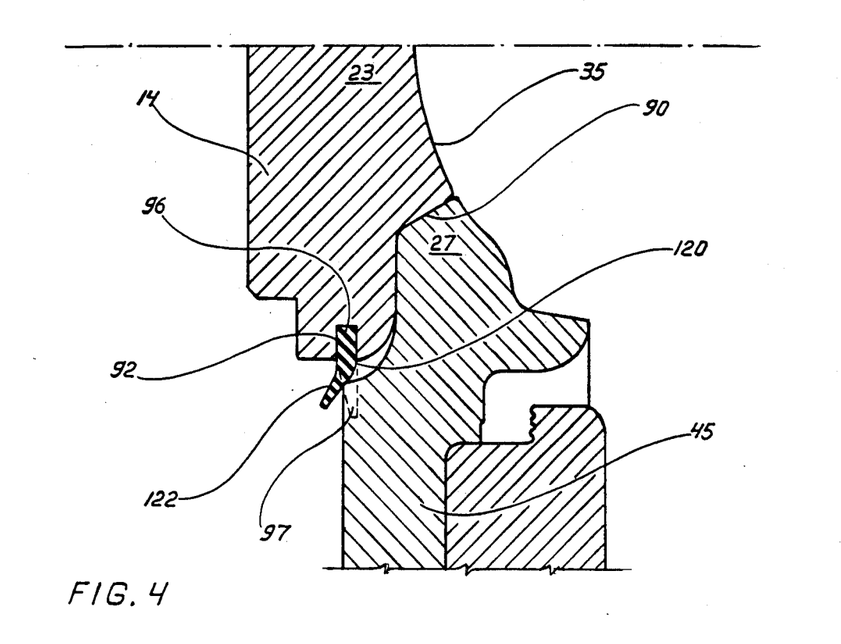
FIG. 4 is a partial side elevational view of a mold and molding press embodying an alternate lower bead ring seal for practicing the method of the invention.

Referring to the drawings, FIG. 4 depicts an alternate preferred bead ring seal 92. The seal 92 is configured to be received within a keyway 96 formed in the mold section 14 in lieu of being received in a keyway or notch 96 formed in the moveable bead ring 45 as shown in FIGS. 1 and 2.

Referring to FIGS. 1, 2 and 4, the bead seal depicted in each of these figures includes one seal surface 120 which is exposed via the interface 90 between the moving bead ring 45 and the mold section 14 to whatever pressure exists within the mold cavity 37. An obverse surface 122 is exposed to a pressure sourced elsewhere, generally ambient atmospheric pressure surrounding the mold 10. As the pressure within the mold cavity 37 is decreased, for example by the application of vacuum to the mold cavity 37 via the parting line 16 employing the vacuum conduit means 52, a differential between the pressure at surface 122 and the pressure at surface 120 increases, pressing the seal 92 more firmly into sealing contact. Such a seal is often termed "self-actuating", that is, one capable of seating more tightly as a pressure differential between the surfaces 120, 122 increases.

Likewise, the shroud seal 81 includes a surface 124 exposed to pressure within the mold cavity via the parting line 16 and an obverse surface 126 exposed to a pressure sourced elsewhere, typically ambient atmospheric pressure surrounding the mold. As with the bead ring seal 92, evacuation of the mold cavity 37 via the parting line 16 imposes a reduced pressure upon the surface 124 of the shroud seal 81 and a differential between the pressures perceived by the surfaces 124, 126 effectively forces the shroud seal 81 more tightly into sealing contact with the mold section 14.

The seals 81, 92 should be sufficiently resilient to be capable of being forced by the differential pressures perceived between the surfaces 124, 126, 120, 122 during evacuation of the mold to allow resilient movement for establishing tight sealing. Conversely, the seal should not be so resilient as to be capable of being sucked into the parting line 16 or the interface 90 under the influence of a pressure differential between the surface pairs 120, 122 and 124, 126.

Figure 5:
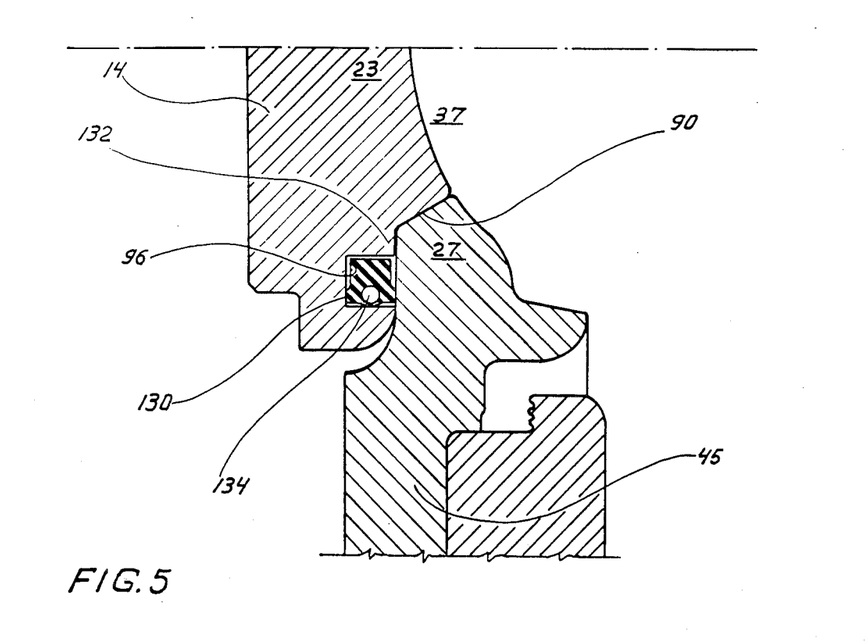
FIG. 5 is a partial side elevational view of a mold and molding press depicting an alternate lower bead ring seal for practicing the method of the invention.

Referring to the drawings, FIG. 5 depicts an alternate seal configuration for use in sealing between a lower bead ring 45 and a mold section 14. A recess 96 is formed in the mold section 14, but equally could be formed within the lower bead ring 45, and a hollowly tubular seal 130 is received within the recess 96. The seal 130 includes an outer surface 132 exposed to pressure within thd mold cavity 37 and an inner or obverse surface 134. The obverse surface 134 defines a tube within the seal; this tube is charged with a fluid under a pressure, typically a liquid or air. As the mold cavity 37 is evacuated, the differential between pressure within the mold cavity perceived by the surface 132 via the interface 90 decreases relative to the pressure perceived by the surface 134 thus expanding the seal into sealing contact. While not essential, it is frequently desirable that the tube defined by the obverse surface 134 be inflatable employing a liquid or a gas under pressure in known manner. Alternately, thermal expansion of a fluid within the tube, or the presence of a spring such as a helical spring or a rubber "O" ring within the tube can expand the seal.

Figure 7:
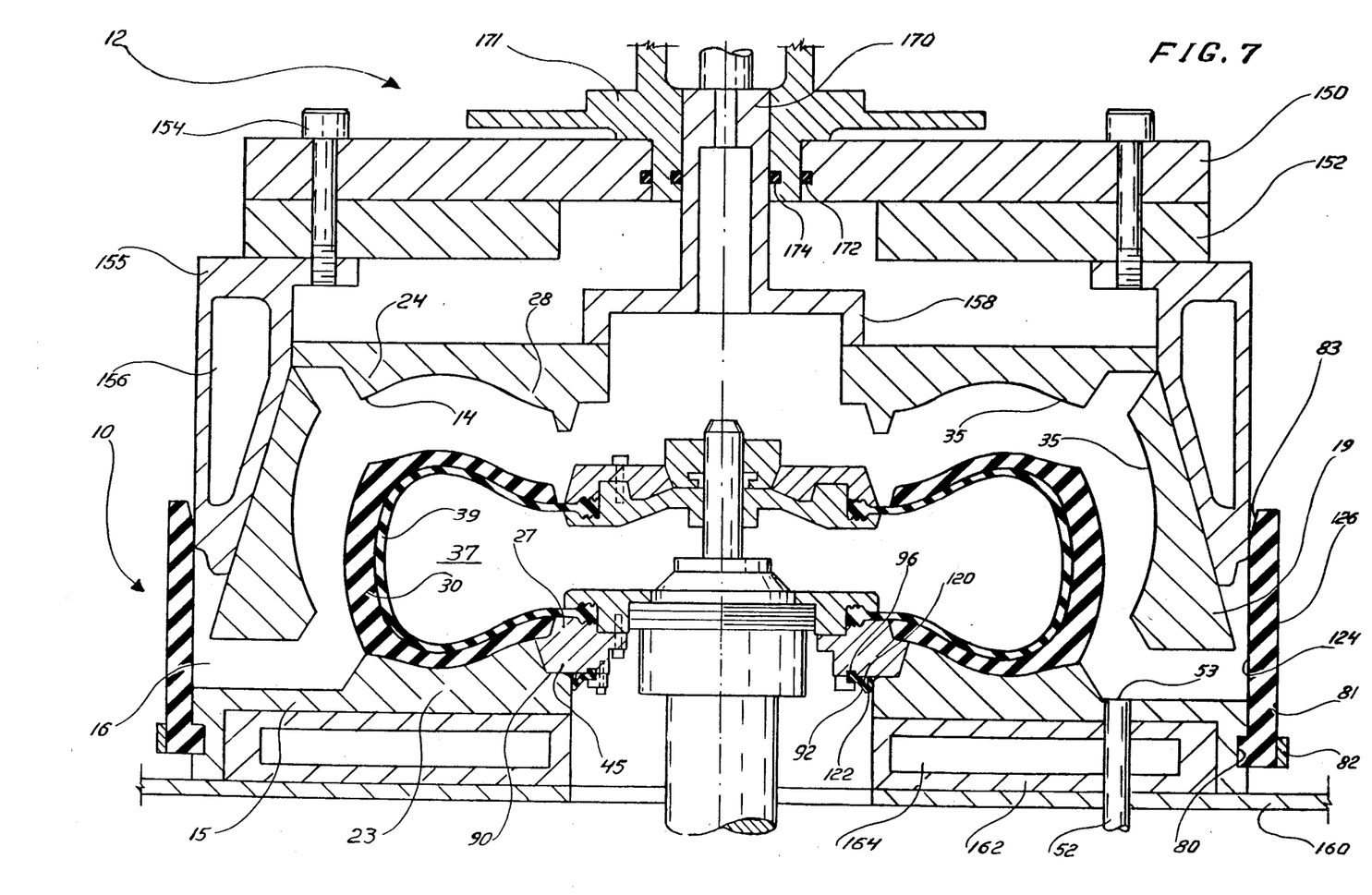
FIG. 7 is a partial side elevational view of a mold and molding press embodying the instant invention.

Referring to the drawings, FIG. 7 depicts a radially opening mold 10 together with a mold press 12 upon which the instant invention may be practiced. The mold 10 includes mold sections or plates 14, 15. A parting line 16 separates the mold plates 14, 15. The upper mold plate 14, includes a tread ring component 19, a sidewall component 24, and a bead ring component 28. The bead ring component 28 is integral to the mold portion 14. The mold portion 15 includes a sidewall component 23 and a bead ring component 27 formed by a moveable bead ring 45.

The mold sections 14, 15 define a molding surface 35. Upon mold closure a mold cavity 37 is created within the mold 10. A bladder 39 is retained in suitable or conventional manner within the mold cavity 37 and functions to shape a tire 30 received in the mold outwardly against the molding surface 35.

The press 12 includes a top platen support 150, a top platen 152, and a plurality of actuator ring sections 155 one or more of which may optionally include a steam chamber 156 by which an actuator ring segment 155 may be heated. The top platen support 150, top platen 152 and actuator rings segments 155 are retained one to the next employing a plurality of bolts 154. Interfaces between the top platen support 150, top platen 152, and actuator ring segments 155 should be sealed employing suitable or conventional gasketing "O" rings, or the like (not shown).

The press 12 also includes a press base 160. The press base supports a bottom platen 162 that may include at least one steam chamber 164 by which the bottom platen may be heated. The bottom platen 162 supports the mold section 15.

The mold section 14 is supportably carried by a mold adaptor ring 158 having an elongated shaft portion 170 slidably received within a bushing 171. The bushing 17 is supported by the top platen support 150. A pair of O-rings 172, 174 function to seal between the top platen support 150 and the bushing 171 and between the bushing 171 and the shaft portion 170. Air movement into the mold cavity 37 from points external to the mold along interfaces between the top platen support 150 and the bushing 171 and between the bushing 171 and the shaft portion 170 is thereby substantially precluded.

A parting line seal 81 is received in a keyway 80 formed in the mold section 15. The seal 81 is configured to circumferentially surround the mold 10. A band clamp 82 functions to retain the seal 81 within the keyway 80. The seal optionally includes a beveled portion 83 for facilitating sliding engagement with the tread component 19 of the mold section 14. The seal 81 includes a surface 126 exposed to pressure external to the mold cavity 37 and a surface 124 exposed to pressure internal to the mold cavity 37 whereby evacuation of the mold cavity 37 results in an increased pressure differential between the surfaces 124, 126 and urges the seal more tightly into sealing engagement with the tread A plurality of accumulators 145, 146, 147 are joinable to the vacuum source 141 employing valves 148, 149, 150.

By opening the valve 144 and the valve 150, and by operating the vacuum source 141 with the valve 142 in a closed position, the accumulator 147 may be evacuated to a desired vacuum. In similar manner, the accumulators 146, 145 may be evacuated to a desired vacuum. After closing the valves 148, 149, 150 and the valve 144, the valve 142 may be opened to initiate evacuation of a mold cavity 37 employing the vacuum conduit means 52. The valve 148 may then be opened to evacuate a substantial portion of the air from the mold cavity 37. The valve 148 may then be closed and the valve 149 opened to evacuate still more air from the cavity 37 of FIGS. 1-2 and 7. Such staged evacuation enables rapid achievement of very high vacuum levels in lieu of merely waiting for a vacuum pump to "catch up". The valve 149 may then be closed and the valve 150 opened so that remaining air in the cavity 37 may be evacuated to the accumulator 147. The valve 142 may then be closed and the process of evacuating the accumulators 145, 146, 147 reinitiated employing the vacuum source 141.

A process configuration by which the accumulators may be evacuated and then employed to evacuate a mold cavity is set forth in Table I.

TABLE I

| Valve # | READY | STEP 1 | STEP 2 | STEP 3 | STEP 4 | EVACUATE STEP 5 |
|---|---|---|---|---|---|---|
| 143 | O | C | C | C | C | O |
| 142 | C | O | O | O | O | C |
| 148 | O | C | O | C | C | O |
| 149 | O | C | C | O | C | O |
| 150 | O | C | C | C | O | O |
| 144 | O | C | C | C | C | O |
| TIME (Range) (secs) | | ½-10 | 2-15 | 2-15 | 2-15 | 15-300 |
| TYPICAL (secs) | | ½ | 3 | 3 | 3 | 150 | component 19 of the mold section 14.

A self-actuating seal 92 is provided received retainably within a keyway 96 formed in the moveable bead ring 45. The seal includes a surface 122 exposed to pressure external to the mold cavity 37 and a surface 120 exposed a pressure internal to the mold cavity 37. Evacuation of the mold cavity 37 produces a pressure differential between the surfaces 122, 120 resulting in the seal being urged more forcefully into sealing contact with the mold section 15.

A vacuum conduit 52 is a formed through the mold section 15, the bottom platen 162, and the press base 160. The vacuum conduit includes a point 53 of interface or intersection with the parting line 16.

Figure 3:
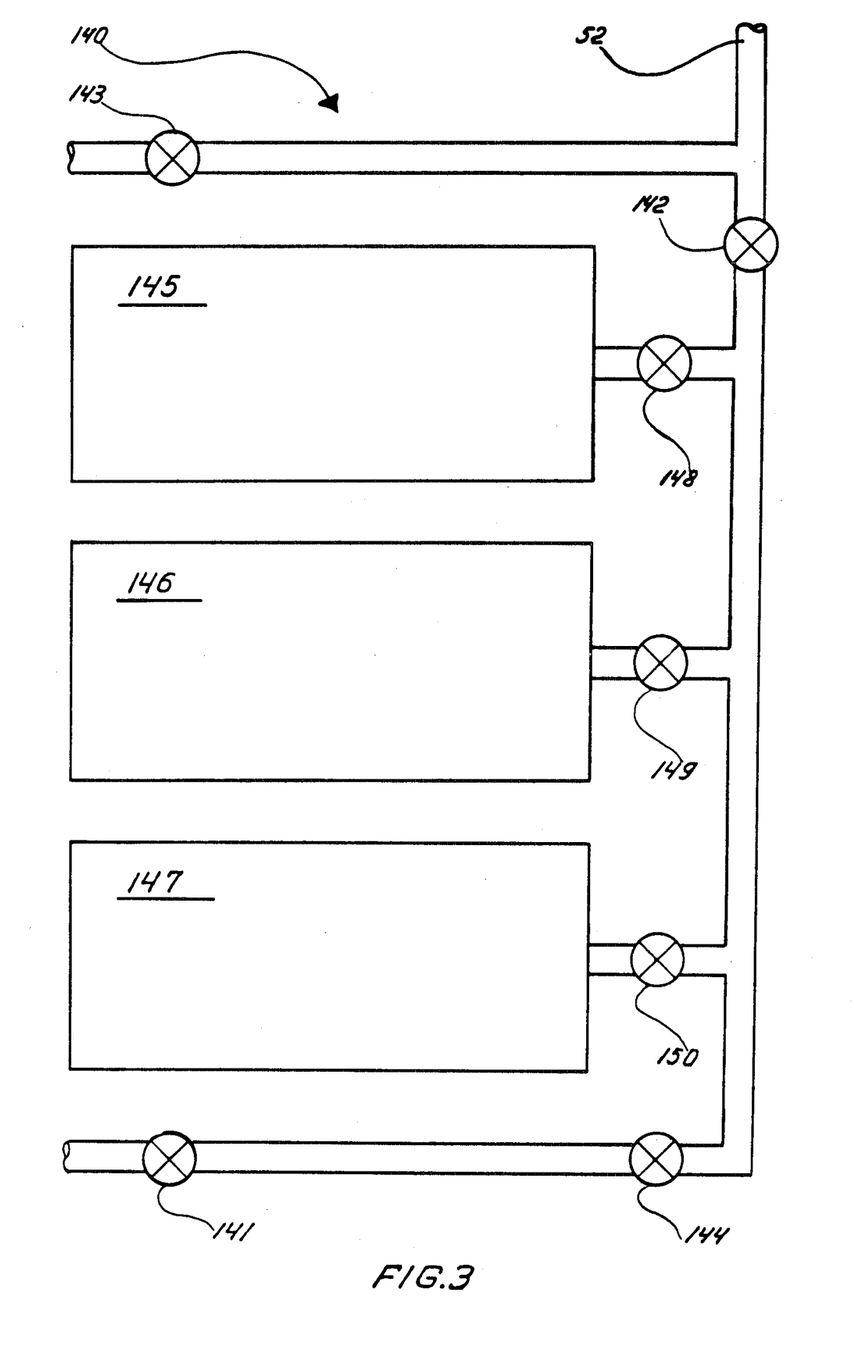
FIG. 3 is a schematic representation of a vacuum source for use in conjunction with the practice of the method of the instant invention.

Referring to the drawings, FIG. 3 is a schematic representation of a vacuum system 140 suitable for use in the practice of the instant invention. The vacuum system 140 includes a vacuum source 141 that can be of any suitable or conventional nature such as conventional vacuum pumps, ejectors, or jets. The vacuum system 140 includes a valve 142 by which the mold vacuum conduit means 52 may be isolated from the vacuum system 140, and a vent valve 143 via which the vacuum conduit means 52 may be vented. A valve 144 interruptably joins the vacuum source 141 to the vacuum system 140.

Evacuation should be accomplished in not more than approximately 55-60 seconds and preferably is accomplished in less than 45 seconds and most preferably within approximately 10-15 seconds. The accumulators 145, 146 147, and the vacuum conduit means 52 by which vacuum may be drawn on the mold cavity 37 should be configured to permit evacuation of the mold cavity 37 to a pressure not exceeding 16932 Pa and preferably not exceeding 8466 Pa within at least one minute and preferably in less than 45 seconds. More preferably evacuation is accomplished to less than 8466 Pa, even more preferably less than 6600 Pa and most preferably less than 2000 Pa, within not more than approximately 15 seconds. These pressures are necessary to eliminate sufficient air from the mold cavity so that the final, cured, tire properly conforms to the molding surfaces 35 and that an air layer between the molding surfaces and the curing tire within the mold does not insulatingly interfere with the curing process.

It is important to note in FIGS. 1-2 that no provision is made for mold venting through traditional vent passageways provided through the tread and sidewall components of the mold 19, 20, 23, 24 to release air trapped within the mold as the mold is closed. Instead, the instant invention employs use of a vacuum drawn through the vacuum conduit means 52 rapidly and deeply to evacuate quickly air from the mold cavity 37 in preparation for the actual tire molding operation.

The process for making a tire employing vacuum evacuation of a molding cavity begins as do most tire making processes with the building of a green tire. A green tire is constructed from uncured or so-called green rubber and other components upon a tire building machine in well known manner. Typically, for radial tire, the green tire building machine includes a building drum to which a tire liner and tire body plies are applied. Material overlapping the drum is turned down and a bead assembly is applied to the edge of the building drum. The overlapping plies are then turned up over the bead package and back onto the building drum. An extruded rubber sidewall is applied to the tire plies and the carcass is expanded to a desired diameter. Reinforcing belts then are applied, an extruded tread is applied over the belts and any air trapped between the belts and the tread is removed in any suitable or conventional manner such as by a so-called "stitching" operation. The tire is now ready for vulcanization or curing.

Referring to FIGS. 1–2, the mold is opened by moving the sections 14,15 apart in a direction perpendicular to the parting line 16 whereby a green tire 30 may be placed within the mold cavity 37. Once the green tire is positioned within the mold cavity 37, the bladder 39 is inflated with low pressure or so-called shaping steam having a gauge pressure of between about 6895 and 68947 Pa or more which causes the bladder to expand filling the tire.

The press is then closed until the mold sections 14, 15 are spaced apart between about 0.10 and 5.08 centimeters as measured perpendicularly to the parting line 16 between the mold sections 14, 15, and preferably to a point whereby the mold sections 14, 15 are separated by between about 1.91 and 3.81 centimeters and most preferably to between 2.54 and 3.18 centimeters, as measured perpendicularly to the parting line 16. The gauge pressure of shaping steam being supplied to the bladder 39 is then reduced to between about 6800 Pa and about 41000 Pa and vacuum is applied to the mold cavity through the vacuum conduit means 52 along the parting line 16.

Preferably, the vacuum source comprises a plurality of accumulators such as are shown in FIG. 3 and vacuum from the accumulators 145, 146, 147 is successively, that is consecutively, applied to the mold cavity 37 to rapidly reduce the absolute pressure within the mold cavity to not more than 16932 Pa, and preferably not more than 8466 Pa, more preferably not more than 6600 Pa and most preferably not more than 2000 Pa. Typically, the absolute pressure within the mold cavity is reduced to approximately 1300 Pa. During evacuation of the mold the seal 81, 92 must firmly engage to preclude essentially all movement of air from points external to the mold into the mold cavity 37. Failure of the seals 81, 92 to adequately prevent such air movement will result in an improper vacuum being drawn upon the mold cavity 37 potentially resulting in a surface blemished or so called "light" tire being produced as a result of the curing process.

The mold 10 subsequently is fully closed and the curing cycle started. The seals 81, 92 must continue to preclude essentially all movement of air from points external to the mold into the mold cavity as the mold 10 closes and while the mold 10 remains closed. The tire is then subjected to either a hot water cure or a so-called steam cure. Under a steam cure, the bladder 39 is filled with steam at a gauge pressure of approximately 1379–1724 kPa for approximately 15 minutes after which the steam is blown down to atmospheric pressure and a vacuum is applied to collapse the bladder 39. The press 12 is opened and the tire, now having curable components thereof having been cured or so-called vulcanized, is removed.

Where a hot water cure is employed, the bladder 39 is filled with high pressure steam at between approximately 1379–1724 kPa for approximately 2 minutes, after which high pressure hot water is circulated through the bladder at between approximately 1724–2758 kPa at approximately 198° C. for between about 10 and 14 minutes. Hot water within the bladder then is removed and displaced by high pressure steam for approximately 2 minutes after which steam contained within the bladder 39 is blown down to atmospheric pressure and a vacuum is applied to collapse the bladder 39. The press is opened and a cured or vulcanized tire then is removed.

Tires resulting from the practice of the instant invention are characterized by the absence, when removed from the mold cavity, of so-called vents or projections protruding generally outwardly from the profile of the tire from the sidewall, tread, and bead portions of the tire and resulting from the presence of cured rubber within mold vent passageways normally provided within the sidewall 19, 20, tread 23, 24, and bead 27, 28 portions of a tire mold of conventional configurations. The absence of such projections obviates a requirement for trimming the tire by placing the tire on a tire trimming machine and cutting off or otherwise removing such projections to dress the tire for sale, and can result in savings of approximately one ounce of uncured rubber per tire manufactured because of the necessity for including extra rubber in a green tire being built to allow for losses associated with green rubber entering the vents of the tire mold and curing therein. The cured tire, removed from a mold after being formed in accordance with the method of the instant invention is possessed of particularly sharply delineated sidewall surface and tread contouring since, as a result of virtually complete air removal, the green tire is capable of conforming most closely to contours of the molding surface 35 within the tire mold 10 during the curing process.

The desired vacuum must be achieved in the mold cavity 37 within a relatively short time period. Desirably, the desired vacuum is achieved within not more than about 60 seconds and preferably within not more than about 45 seconds. Most preferably the vacuum is achieved within not more than 30 seconds and typically, where a multi-stage vacuum system such as is depicted in FIG. 3 is employed for evacuating the mold, desired vacuum may be achieved in approximately 6 to 15 seconds.

In the event of elevated times for achieving a vacuum within the tire mold, and particularly those time periods exceeding about 60 seconds, there is a tendency for the tire to overshape as a result of bladder pressure, becoming pinched and thereby misshapen as the mold closes. Also, in the event the time period for evacuating the mold exceeds about 60 seconds, the bladder may collapse, steam pressure within the bladder being reduced during the drawing of vacuum in order to avoid overshaping. In addition, an excessively long time period for achieving evacuation of the mold cavity 37 can cause rubber to enter the parting line 16 and thereby at least partially seal off channels by which air remaining within the mold cavity 37 can be conducted to the vacuum system. Lastly, during an excessively long period for evacuating the mold, the tire may objectionably partially cure before the mold fully closes, particularly in cure sensitive areas such as tire sidewalls where the quantity of curable elastomeric rubber is relatively limited as compared to, for example, the tire tread.

It should be apparent, that one aspect important in implementing the method of the instant invention is the relatively free and rapid movement of air from the mold cavity 37 to the vacuum conduit means 52 for transmission to the vacuum system 140. Where the mold 10 is closed excessively, particularly to an opening width of less than 0.10 centimeters along the parting line, free movement of air to the vacuum conduit means 52 is substantially restricted and evacuation times can become excessively prolonged. Further, in closing the mold to a parting line opening of less than approximately 0.10 centimeters, a significant opportunity arises for the tire, under impetus of the expanded bladder and the virtually closed mold, to expand, trapping air along the sidewall 19, 20, bead 23, 24, and tread 27, 28 components of the mold and precluding the entrapped air from being evacuated from the mold. A light tire results.

The ultimate extent to which a mold may remain open along the parting line 16 during evacuation of the mold cavity 37 in preparation for vulcanizing and shaping a tire is dependent on the capability of the seals 81, 92 to substantially preclude the movement of air from points external to the mold into the mold cavity. Practically, this limitation has been found to preclude mold openings greater than approximately 5.08 centimeters; however, with the availability of a suitable sealing configuration, mold openings somewhat in excess of approximately 5 centimeters can be accommodated, provided that evacuation of the mold cavity is accomplished sufficiently rapidly to prevent overstressing of the green tire being molded, and that movement of uncured elastomeric tire component material into the parting line 16 is precluded. The vacuum conduit means 52 is conveniently configured to be of a size amenable to connection with conventional piping; typically, the vacuum conduit means 52 is configured for connection to ¾ or 1 inch nominal size pipe. A plurality of such vacuum conduit means 52 spaced circumferentially around the tire mold 10 in a size sufficient given the particular number of vacuum conduit means 52 being provided to evacuate the mold cavity adequately within a desired time period are contemplated as being within the purview of this invention. At least with a staged system 140 of vacuum accumulators configured for consecutive application to the evacuation of a tire mold 10, a single vacuum conduit means 52 of approximately ¾ inch nominal pipe size has been found adequate in accomplishing the evacuation of the tire mold. The vacuum conduit means 52 need not be circular in cross section but may assume any cross-sectional configuration desirable for fabrication within the mold 10 and amenable to interconnectable attachment with the vacuum system 140.

As set forth herein, a wide variety of materials are available for fabrication of the seals 81, 92. It is desirable in the fabrication of seals for use in the practice of the instant invention, that the seals be capable of delivering a service life at least equal to a service life available from the bladder 39. Therefore, silicone rubbers, epoxy cured butyl rubbers, and so-called flurorubbers find particular attractiveness in the practice of the instant invention as being capable of delivering an elevated surface life. It is particularly important that such rubbers be relatively free from permanent deformation at whatever temperature to which the mold and bladder are heated to in curing the tire. That is to say, that the seals 81, 92 should be capable of surviving without substantial permanent deformation temperatures of at least 198° C.

Figure 6:
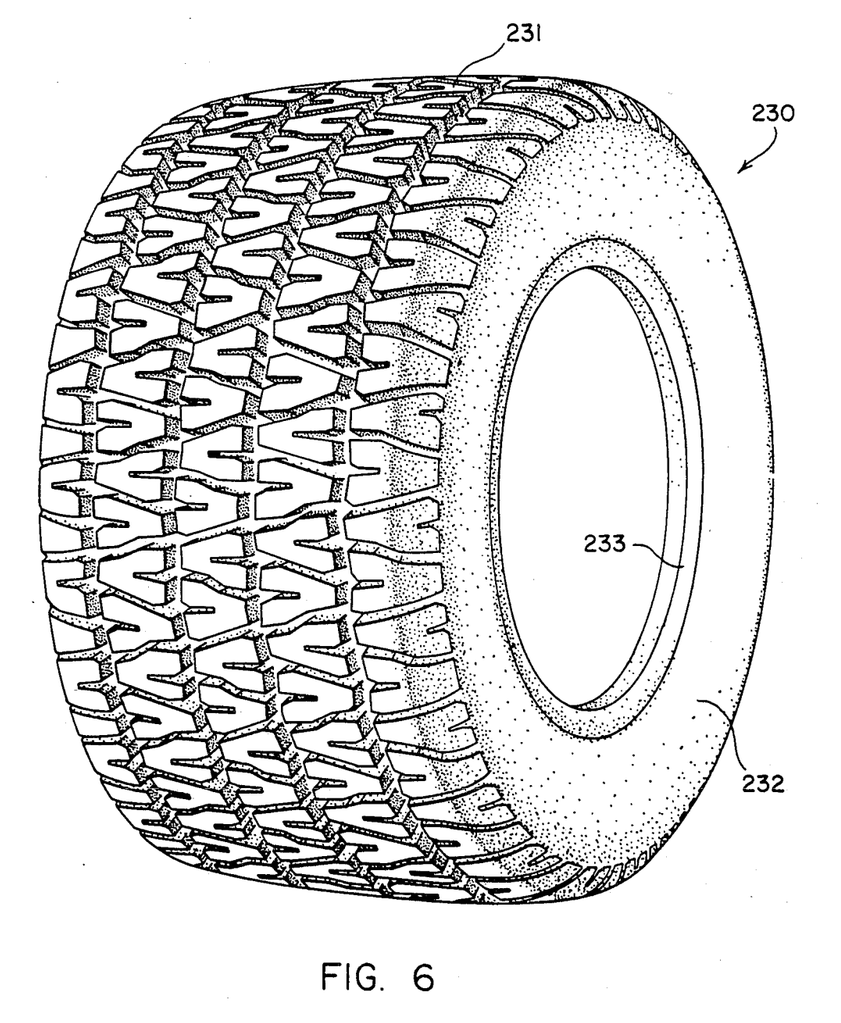
FIG. 6 is a depiction of a tire made in accordance with the instant invention.

Referring to the drawings, FIG. 6 depicts a tire 230 made in accordance with the process of the instant invention upon emerging from the mold cavity having outermost tread 231, sidewall 232 and bead portions 233 define the tire 230 profile free of protrusions in the form of vents. No trimming of such a tire 230 is required to remove protrusions resulting from the curing of green tire rubber in mold vents. A savings in green rubber is thereby realized, as no losses to such trimming are thereby incurred.

While specific preferred embodiments of the invention has been shown and described in detail, it should be apparent that various modifications may be made thereto without departing from the scope of the claims that follow. Particularly, while the invention has been depicted upon the presses of FIGS. 1-2, ready adaptation may be made to so-called radial-opening presses.

What is claimed is:

1. In a process wherein a green tire having tread, sidewall and bead portions is formed and then molded within a tire mold having tread, sidewall and bead components defining a mold cavity, such components being essentially free of apertures leading from the mold cavity to a point external to the mold, and a parting circumferential line dividing the mold into sections, the mold closing to the parting line to effectuate tire molding, the improvement comprising:

placing the green tire within the mold cavity;

partially closing the mold to be open along the parting line not more than about 5.08 and not less than about 0.10 centimeters;

annularly surrounding in a sealing relationship the parting line radially outwardly of the tread components employing a seal effectively sealing between outer surfaces of the mold as separated by the parting line and characterized by one seal surface being exposed to pressure within the mold cavity and an obverse seal surface being exposed to a pressure sourced outside the mold cavity, and whereby upon evacuation of the mold cavity, by inherent seal configuration, the seal is urged into a more tightly sealing relationship, the seal being configured to sealingly engage beginning in a range of mold openings along the parting line of between 0.10 and not more than 5.08 centimeters to substantially preclude the movement of air into the mold cavity, and the seal being configured to be capable of continuing to preclude such air movement during and after mold closure providing a source of vacuum interconnectably joined employing a conduit means to the parting line, and drawing a vacuum on the mold.

2. In the method of claim 1, at least one bead component being moveable relative to an adjacent sidewall component, and including the step of sealing between the bead and sidewall components employing a bead seal circumferentially sealing between the bead component and sidewall components while the parting line seal is sealingly engaged, the bead seal being affixed to one of the bead and sidewall components and being characterized by one seal surface being exposed to pressure within the mold cavity and an obverse surface being exposed to a pressure sourced outside the mold cavity and whereby upon evacuation of the mold cavity by inherent seal configuration, the seal is urged into a more tightly sealing relationship, and the seal being configured to be capable substantially precluding the movement of air into the mold cavity at least coextensively with the parting line seal and of continuing to exclude such air movement even after mold closure.

3. The process of claim 2, the seals for bead and parting line being self actuating seals.

4. The process of claim 2, the seals for bead and parting line being of an inflatable tube configuration.

5. The process of any one of claims 1-4, wherein said vacuum source includes a plurality of accumulators configured for consecutive interconnection to said conduit means.

6. The process of any one of claims 1-4, said vacuum source being configured for evacuating the mold to not more than 8466 Pa within not more than 45 seconds.

7. The process of claim 1, said vacuum source and conduit means being configured for evacuating the mold to not more than 6600 Pa within not more than 15 seconds.

* * * * *

UNITED STATES PATENT AND TRADEMARK OFFICE
CERTIFICATE OF CORRECTION

PATENT NO. : 4,595,553
DATED : June 17, 1986
INVENTOR(S) : Jerome John Blayne, James Sidles, Donald Ray Bartley It is certified that error appears in the above-identified patent and that said Letters Patent are hereby corrected as shown below:

Column 2, lines 35 and 36, "retreating" should read ---retreading---.

Column 6, line 58, "chamber" should read ---chamfer---.

Signed and Sealed this

Twenty-first Day of October, 1986

[SEAL]

Attest:

DONALD J. QUIGG

Attesting Officer

Commissioner of Patents and Trademarks